United States Patent [19]

Masatoshi

[11] Patent Number: 5,159,026
[45] Date of Patent: Oct. 27, 1992

[54] CROSSLINKABLE, FLUORINE-CONTAINING ELASTOMER COMPOSITION

[75] Inventor: Abe Masatoshi, Kitaibaraki, Japan

[73] Assignee: Nippon Mektron, Limited, Tokyo, Japan

[21] Appl. No.: 550,723

[22] Filed: Jul. 10, 1990

[30] Foreign Application Priority Data

Jan. 31, 1989 [JP] Japan ................. 1-198591

[51] Int. Cl.$^5$ .............................. C08F 8/00
[52] U.S. Cl. ................. 525/387; 525/326.2; 525/326.3; 525/326.4
[58] Field of Search ........... 525/387, 326.2, 326.3, 525/326.4

[56] References Cited

U.S. PATENT DOCUMENTS

| | | | |
|---|---|---|---|
| 4,708,988 | 11/1987 | Tabb | 525/387 |
| 4,774,302 | 9/1988 | Haruyoshi et al. | 525/326.4 |
| 4,831,089 | 5/1989 | Okabe et al. | 525/387 |
| 4,981,918 | 1/1991 | Okamoto et al. | 525/387 |

*Primary Examiner*—Bernard Lipman
*Attorney, Agent, or Firm*—Fred Philpitt

[57] ABSTRACT

A cross-linkable fluorine-containing elastomer composition comprising a fluorine-containing elastomer containing at least one of iodine and bromine in the molecule, an organic peroxide having a peroxy group —O—O—C(CH$_3$)$_2$R, where R is a lower alkyl group, in the molecule and an activation energy of not more than 34.0 Kcal/mole and another organic peroxide having the same peroxy group as defined above in the molecule and an activation energy of less than 34.0 Kcal/mole as cross-linking agents for the elastomer has less generation of CH$_3$I or CH$_3$Br at the decomposition of the organic peroxides without any substantial decrease in the compression set of the volcanization products.

6 Claims, No Drawings

CROSSLINKABLE, FLUORINE-CONTAINING ELASTOMER COMPOSITION

BACKGROUND OF THE INVENTION

1. Field of the Invention

This invention relates to a crosslinkable, fluorine-containing elastomer composition, and more particularly to a crosslinkable, fluorine-containing elastomer composition, which comprises a fluorine-containing elastomer containing at least one of iodine and bromine in the molecule and an organic peroxide.

2. Description of the Prior Art

Organic peroxide crosslinking of fluorine-containing elastomer has been regarded as more distinguished than the conventional crosslinking procedures such as polyol crosslinking, polyamine crosslinking, etc. because the organic peroxide crosslinked product has distinguished resistances to engine oil, solvent, etc.

As organic peroxide-crosslinkable, fluorine-containing elastomer, those containing both iodine and bromine, or iodine or bromine in the molecule have been proposed by the present applicants and others [U.S. Pat. No. 4,774,302; Japanese patent application Kokai (Laid-open) Nos. 62-232,407, 53-125,491, 60-221,409, 59-20,310, 62-260,807 and 63-308,008; Japanese Patent Publication No. 54-1,585, etc.].

However, an organic peroxide to be used for the crosslinking generates toxic compounds such as methyl iodide ($CH_3I$) or methyl bromide ($CH_3Br$) derived from the methyl group in the molecule when decomposed, thereby being about a problem that is hardly ignorable in the maintenance of working site or surrounding atmosphere.

In this connection, the present applicant have proposed a peroxide-vulcanizable, fluorine-containing elastomer composition with less generation of $CH_3I$ or $CH_3Br$ at the decomposition of an organic peroxide, which comprises a fluorine-containing elastomer containing at least one of iodine and bromine in the molecule and an organic peroxide having a peroxy group represented by the general formula $-O-O-C(CH_3)_2R$, wherein R is a lower alkyl group, in the molecule and an activation energy of not more than 34.0 Kcal/mole [Japanese Patent Application Kokai (Laid-open) No. Hei 2-43232] and the composition using a sulfur-containing compound so far used as a ruffer additive together the organic peroxide (Japanese Patent Application No. 63-316201).

These proposed compositions can attain the object of effectively lowering the generation of toxic gases satisfactorily, but lower the compression set of vulcanization products as an index of sealing characteristics. Thus, further improvement has been desired.

SUMMARY OF THE INVENTION

An object of the present invention is to provide a peroxide-vulcanizable, fluorine-containing elastomer composition, capable of effectively lowering generation of toxic gases without any substantial decrease in compression set of vulcanization products.

DETAILED DESCRIPTION OF PREFERRED EMBODIMENTS

The crosslinkable, fluorine-containing elastomer composition capable of attaining the object of the present invention comprises a fluorine-containing elastomer containing at least one of iodine and bromine in the molecule, an organic peroxide (A) having a peroxy group represented by the general formula $-O-O-C(CH_3)_2R$, wherein R is a lower alkyl group in the molecule and an activation energy of not less than 34.0 Kcal/mole and another organic peroxide (B) having the same peroxy group as defined above in the molecule and an activation energy of less than 34.0 Kcal/mole.

Fluorine-containing olefins constituting the main part of a fluorine-containing elastomer containing at least one of iodine and bromine in the molecule for use in the present invention have preferably 2 to 8 carbon atoms and include, for example, vinylidene fluoride, tetrafluoroethylene, hexafluoropropene, pentafluoropropene, chlorotrifluoroethylene, methyl perfluorovinyl ether, ethyl perfluorovinyl ether, n- or iso-propyl perfluorovinyl ether, n-, iso- or tert-butyl perfluorovinyl ether, n- or iso-amyl perfluorovinyl ether, perfluoro(methyl vinyl ether), perfluoro(ethyl vinyl ether), perfluoro(n- or iso-propyl vinyl ether), perfluoro(n-, iso- or tert butyl vinyl ether), perfluoro(n- or iso-amyl vinyl ether), perfluoro(propoxypropyl vinyl ether), etc. at least one of which is mainly used. Besides the foregoing compounds, vinyl fluoride, trifluoroethylene, perfluorocyclobutene, perfluoro(methylcyclopropene), hexafluoroisobutene, 1,2,2-trifluorostylene, perfluorostyrene, etc. can be used.

These fluorine-containing olefins can be also copolymerized with at least one of olefinic compound having 2 to 6 carbon atoms and fluorine-containing dienes having 4 to 8 carbon atoms.

The olefinic compound has 2 to 6 carbon atoms and includes, for example, olefins such as ethylene, propylene, butene; unsaturated vinyl esters such as vinyl acetate, and alkyl vinyl ethers such as methyl vinyl ether, ethyl vinyl ether, and is generally copolymerized in a proportion of about 0.1 to about 50% by mole as contained in the fluorine-containing elastomer.

The fluorine-containing diene has 4 to 8 carbon atoms, and includes, for example, perfluoro-1,3-butadiene, perfluoro-1,4-pentadiene, 1,1,2-trifluoro-1,3-butadiene, 1,1,2-trifluoro-1,4-pentadiene, 1,1,2,3,3-pentafluoro-1,4-pentadiene, perfluoro-1,7-octadiene, perfluorodivinyl ether, perfluorovinyl perfluoroallyl ether, vinyl perfluoroallyl ether, perfluorovinyl vinyl ether, etc. It is preferable that the fluorine-containing diene is copolymerized in a proportion of not more than 1% by mole, as contained in the fluorine-containing elastomer. When copolymerized in a proportion above about 1% by mole, the copolymer elastomer undergoes considerable gelation, deteriorating the processability(flow characteristics) and the elongation of the vulcanized products.

Specific fluorine-containing olefin copolymers include, for example, hexafluoropropene-vinylidene fluoride copolymer, hexafluoropropene-vinylidene fluoride-tetrafluoroethylene terpolymer, tetrafluoroethylene-vinylidene fluoride-perfluoro(methyl vinyl ether) terpolymer, tetrafluoroethylenevinylidene fluoride-perfluoro(propyl vinyl ether) terpolymer, tetrafluoroethylene-perfluoro(propoxypropyl vinyl ether) copolymer, tetrafluoroethylene-perfluoro(methyl vinyl ether) copolymer, tetrafluoroethylene-propylene copolymer, tetrafluoroethylene-vinylidene fluoride-hexafluoropropenepentafluoropropene quaternary copolymer, tetrafluoroethylenehexafluoropropene-vinylidene fluoride-perfluoro(methyl vinyl ether) quaternary copolymer, tetrafluoroethylenehexafluoropropene-hexafluoroisobutene terpolymer, tetrafluoroethylenecyclohexyl vinyl ether copolymer, hexafluoropropenevinylidene fluoride-chlorotrifluoroethylene terpolymer, vinylidene fluoride-tetrafluoroethylene-methyl perfluorovinyl ether terpolymer, vinylidene fluoride-tetrafluoroethylene-n-butyl perfluorovinyl ether terpolymer, vinylidene fluoride-methyl perfluorovinyl ether-perfluoro(methyl vinyl ether) terpolymer, tetrafluoroethylene-methyl perfluorovinyl ether-perfluoro(methyl vinyl ether) terpolymer, vinylidene fluoride-hexafluoropropene-tetrafluoroethylenemethyl perfluorovinyl ether quaternary copolymer, tetrafluoroethylene-n-butyl perfluorovinyl ether-perfluoro(methyl vinyl ether) terpolymer, vinylidene fluoride-n-butyl perfluorovinyl ether copolymer, tetrafluoroethylene-propylene-n-butyl perfluorovinyl ether terpolymer, tetrafluoroethylenevinylidene fluoride-propylene-n-butyl perfluorovinyl ether quaternary copolymer, etc.

Polymerization reaction of fluorine-containing olefins or fluorine-containing olefins with the comonomers above mentioned is carried out by a so far well known method, for example, solution polymerization, suspension polymerization or emulsion polymerization.

When the polymerization reaction is carried out in the presence of an iodine and bromine-containing compound, an iodine-containing compound or a bromine-containing compound, iodine and/or bromine is introduced into the fluorine-containing olefin copolymers to form crosslinking points for the organic peroxide crosslinking.

The iodine and bromine-containing compound is saturated or unsaturated linear or aromatic compounds represented by the general formula:

$$RBr_nI_m$$

wherein R is a fluorohydrocarbon group, chlorofluoro hydrocarbon group, chlorohydrocarbon group or hydrocarbon group and n and m are 1 or 2 and preferably n and m are each 1. The linear iodine and bromine-containing compound for use in the present invention includes, for example, 1-bromo-2-iodoperfluoroethane, 1-bromo-3-iodoperfluoropropane, 1-bromo-4-iodoperfluorobutane, 2-bromo-3-iodoperfluorobutane, 3,4-dibromo-1-iodo-1,1,2,2,4,4-hexafluorobutane, 3-bromo-4-iodoperfluorobutene-1, 2-bromo-4-iodoperfluorobutene-1, etc. The aromatic iodine and bromine-containing compound for use in the present invention includes, for example, monoiodomonobromo-substituted benzenes, diiodomonobromo-substituted benzenes, monoidododibromo-substituted benzenes, (2-iodoethyl) and (2-bromoethyl)-substituted benzenes, etc. at various substitution positions. These iodine and bromine-containing compounds generally combine with the fluorine-containing olefin copolymers at the molecule terminals to give fluorine-containing elastomers capable of efficiently making the crosslinking. To this end, about 0.001 to about 5% by weight, preferably about 0.01 to about 3% by weight, of the iodine and bromine-containing compound in terms of iodine and bromine is made to combine with the fluorine-containing olefin copolymers.

As the iodine-containing compound, aromatic compounds or perfluoroaromatic compounds polysubstituted with iodine atoms or iodoalkyl groups, for example, iodoethyl group, are used in a combining ratio of about 0.001 to about 5% by weight, preferably about 0.001 to about 3% by weight, in terms of the iodine in the fluorine-containing elastomer or iodo-substituted, saturated or unsaturated aliphatic hydrocarbons, fluoroaliphatic hydrocarbons or chlorofluoroaliphatic hydrocarbons are used in a combining ratio of about 0.001 to about 10% by weight in terms of the iodine in the fluorine-containing elastomer.

As the bromine-containing compound, aromatic compounds or perfluoroaromatic compounds polysubstituted with bromine atoms or bromoalkyl groups, for example, bromoethyl group, are used in a combining ratio of about 0.001 to about 5% by weight, preferably about 0.01 to about 3% by weight, in terms of the bromine in the fluorine-containing elastomer, or bromine-substituted saturated aliphatic hydrocarbons are used in a combining ratio of about 0.001 to about 10% by weight in terms of the bromine in the fluorine-containing elastomer, or bromine-containing olefins are used in a combining ratio of about 0.05% by weight or more, generally about 0.3 to about 1.5% by weight, in terms of the bromine in the fluorine-containing elastomer. Furthermore, 3- or 2-bromoperfluoropropyl perfluorovinyl ether, etc. can be also used.

The fluorine-containing elastomers containing at least one of iodine and bromine in the molecule, obtained by combination with at least one of the iodine-containing compounds and the bromine-containing compounds can be crosslinked with an organic peroxide (A) having a peroxy group represented by the general formula —O—O—C(CH$_3$)$_2$R, wherein R is a lower alkyl group, in the molecule and an activation energy of not less than 34.0 Kcal/mole and another peroxide (B) having the same peroxy group as defined above in the molecule and an activation energy of less than 34.0 Kcal/mole.

The organic peroxides for use in the present invention are exemplified as follows. These organic peroxides having the following activation energy (unit: Kcal/mole) and a one-minute half-value temperature (unit: °C.).

Organic peroxide (A) having an activation energy of not less than 34.0 Kcal/mole:

| Organic peroxide (A) | Activation energy (Kcal/mole) | Half-value temperature (°C.) |
|---|---|---|
| 2,5-dimethyl-2,5-di(t-butylperoxy)-hexane | 36.3 | 179 |
| 2,5-dimethyl-2,5-di(t-butylperoxy)-hexine-3 | 36.7 | 193 |
| α,α-bis(t-butylperoxy-m-isopropyl)-benzene | 39.2 | 179 |
| Dicumyl peroxide | 40.6 | 171 |

Organic peroxide (B) having an activation energy of less than 34.0 Kcal/mole and preferably having a cyclohexane ring:

| Organic peroxide (B) | Activation energy (Kcal/mole) | Half-value temperature (°C.) |
|---|---|---|
| 1,1-bis(α,α-dimethylbutylperoxy)-cyclohexane | 32.2 | 147 |
| 1,1-bis(t-butylperoxy)-3,3,5-trimethylcyclohexane | 33.2 | 148 |
| 1,1-bis(α,α-dimethylbutylperoxy)-3,3,5-trimethylcyclohexane | 31.8 | 146 |

These organic peroxides are used in a ratio of organic peroxide (A) to another organic peroxide (B) of 1:0.5–10, preferably 1:1–5 and in such an amount as about 0.1 to about 10 parts by weight, preferably about 0.5 to about 5 parts by weight, of sum total of the organic peroxides per 100 parts by weight of fluorine-containing elastomer containing at least one of iodine and bromine. The organic peroxides can be used as a master batch, if required.

Powdery activated carbon or a sulfur-containing compound so far used as a rubber additive as proposed before can be also used together with these two kinds of organic peroxides.

Powdery activated carbon prepared by firing coconut husks, coal, charcoal, wood, petroleum pitch, etc. as raw materials, followed by activation, is generally known, and is characteristic of a high adsorbability. In the present invention, powdery activated carbon prepared from coconut husks, charcoal and wood raw materials are desirable from the viewpoints of adsorbability, particle size (about 5 to about 300 meshes, preferably about 150 meshes or less), availability, etc. Powdery activated carbon having various pH values can be used (pH values are determined by adding powdery activated carbon to boiling water, followed by stirring, leaving the mixture standing, cooling and filtration, and measuring pH values of filtrate phase). Above all, powdery activated carbon having a pH of about 7 to about 12, preferably about 9 to about 11, is preferably used because it can give most preferably physical properties. About 1 to about 30 parts by weight, preferably about 5 to about 10 parts by weight, of the powdery activated carbon is used per 100 parts by weight of the fluorine-containing elastomer.

The sulfur-containing compound includes those given below, and not more than about 10 parts by weight, preferably about 0.5 to about 2 parts by weight, of the sulfur-containing compound is used per 100 parts by weight of the fluorine-containing elastomer.

(1) Thioureas:

N,N'-diphenylthiourea, N,N'-diethylthiourea, trimethylthiourea, tributylthiourea, tetramethylthiourea, tetraethylthiourea, 1,3-bis(dimethylaminopropyl)-2-thiourea, etc.

(2) Thiazoles:

2-mercaptobenzothiazole or its sodium salt, zinc salt, or cyclohexylamine salt, benzothiazole disulfide, 2-(4'-morpholinodithio)benzothiazole, etc.

(3) Thiurams:

Tetramethylthiuram disulfide, tetraethylthiuram disulfide, tetrabutylthiuram disulfide, tetramethylthiuram monosulfide, pentamethylenethiuram disulfide, etc.

(4) Dithiocarbamates:

Zinc salts, sodium salt, copper salts, iron salts, tellurium salts, nickel salts, piperidine salts, etc. of dimethyldithiocarbamic acid, diethyldithiocarbamic acid, dibutyldithiocarbamic acid, N-ethyl-N-phenyldithiocarbamic acid, dibenzyldithiocarbamic acid, N-pentamethylenedithiocarbamic acid, etc.

(5) Xanthogenates:

Zinc butylxanthogenate, zinc isopropylxanthogenate, etc.

(6) Benzimidazoles:

2-mercaptobenzimidazole or its zinc salt, benzyl diazabicycloammonium salt, benzyl triphenylphosphonium salt, 2-mercaptomethylbenzimidazole, etc.

(7) Oxazolines:

2-mercaptobenzoxazoline or its zinc salt, etc.

(8) Sulfenamides:

N-cyclohexyl-2-benzothiazolylsulfenamide, etc.

It is desirable to add to the composition about 0.1 to about 15 parts by weight, preferably about 2 to about 10 parts by weight, of a polyfunctional compound capable of improving the mechanical strength, compression set, etc. such as tri(metha)allyl isocyanurate, tri(metha)allyl cyanurate, triallyl trimellitate, N,N'-m-phenylenebismaleimide, diallyl phthalate, tris(diallylamine)-s-triazine, triallyl phosphite, (di)ethyleneglycol diacrylate, neopentylglycol diacrylate, etc. per 100 parts by weight of the fluorine-containing elastomer.

The composition is prepared by mixing the above-mentioned components with other additives, for example, a filler such as carbon black, a reinforcing agent, a plasticizer, a lubricant, a processing additive, pigment, etc., if required, by any of ordinary mixing procedures, such as roll mixing, kneader mixing, Bambary mixing, solution mixing, etc.

The cross-linking of the composition is carried out generally by primary cross-linking at about 100° to about 250° C. for about 1 to about 120 minutes according to the one-minute half-value temperature of the organic peroxide having a lower activation energy and by secondary cross-linking at about 150° to about 250° C. for about 1 to 30 hours according to the one-minute half-value temperature of the organic peroxide having a higher activation energy.

That is, in order to effectively use the present cross-linkable, fluorine-containing elastomer composition, the primary vulcanization temperature is set to the one-minute half-value temperature of the organic peroxide having a lower activation energy, so that the organic peroxide having a lower activation energy, which is generating less toxic gas, is preferentially applied to the primary vulcanization, whereby workers can be prevented from exposure to toxic substances during the press vulcanization as the primary vulcanization.

The decreased compression set of primary vulcanization products by such organic peroxide can be recovered by setting the secondary vulcanization temperature higher than the one-minute half-value temperature of the organic peroxide having a higher activation energy during the secondary vulcanization, which is generally carried out in an oven provided with a local evacuating unit.

The present peroxide-vulcanizable, fluorine-containing elastomer composition can be not only prevented from generation of toxic gases such as methyl iodide, methyl bromide, etc. during the heated cross-linking of the fluorine-containing elastomer containing at least one of iodine and bromine in the molecule by organic peroxides, but can be also effectively prevented from a decrease in the compression set of the vulcanization products by using two kinds of specific organic peroxides having different activation energies.

Furthermore, the decrease in the compression set can be further suppressed by adding powdery activated carbon to the composition, and the generation of toxic gases can be considerably suppressed by adding a sulfur-containing compound to the composition. When both of the powdery activated carbon and the sulfur-containing compound are added to the composition, the decrease in the compression set and the generation of toxic gases can be effectively suppressed.

The present invention will be described below, referring to Examples.

REFERENCE EXAMPLE 1,500 ml of deionized water and 7.5 g of ammonium perfluorooctanoate were charged into an autoclave having a net capacity of 3 liters, and the inside space of the autoclave was thoroughly flushed with a gas mixture of vinylidene fluoride/hexafluoropropene/tetrafluoroethylene in a ratio by mole of 42/38/20. Then, the inside pressure was increased to 12 kg/cm$^2$ gauge with this gas mixture, and then 4.0 g of 1-bromo-2-iodoperfluoroethane was injected therein. The inside temperature was increased to 80° C. with stirring, where the inside pressure reached 16 kg/cm$^2$ gauge.

Then, 0.5 g of ammonium persulfate dissolved in 20 ml of deionized water was added thereto to initiate the polymerization reaction. Since the inside pressure was decreased as the reaction advanced, and when the inside pressure was lowered down to 15 kg/cm$^2$ gauge, it was again increased to 16 kg/cm$^2$ gauge with a gas mixture of vinylidene fluoride/hexafluoropropene/tetrafluoroethylene in a ratio by mole of 58/20/22. The polymerization was likewise continued under a pressure between 15 and 16 kg/cm$^2$ gauge, and 24 hours thereafter, the unreacted gas mixture was purged from the autoclave to discontinue the polymerization reaction.

An aqueous 5% potassium alum solution was added to the resulting aqueous suspension to coagulate the formed polymers. Then, the coagulated polymers were washed with water and dried, whereby 468 g of rubbery copolymers having a three-components copolymerization molar ratio of 58/25/17 and [$\eta$] = 0.68 (in acetone at 35° C.) were obtained.

EXAMPLES 1 TO 5 AND COMPARATIVE EXAMPLES 1 to 2

100 parts by weight of the fluorine-containing elastomer containing iodine and bromine obtained in the foregoing reference example, 20 parts by weight of MT carbon black, 10 parts by weight of triallyl isocyanurate (concentration: 60%), 3 parts by weight of lead oxide and specific parts by weight of two kinds or organic peroxides given below were roll kneaded.

|  | Example No. | | | | | Comp. Ex. No. | |
|---|---|---|---|---|---|---|---|
| Organic peroxide | 1 | 2 | 3 | 4 | 5 | 1 | 2 |
| 2,5-dimethyl-2,5-di(t-butylperoxy)-hexane (parts by weight) | 3 | 2 | 1 | 2 | 3 | 3 | |
| 1,1-bis($\alpha,\alpha$-dimethylbutylperoxy)-cyclohexane (parts by weight) | 1 | 1 | 1.5 | 1.5 | 1.5 | | 1.5 |

The thus prepared fluorine-containing elastomer compositions were vulcanized and shaped into sheets and P-24 O-rings by primary vulcanization at 150° C. for 10 minutes and secondary vulcanization at 200° C. for 22 hours.

The thus prepared sheets were subjected to measurement of vulcanization physical properties according to JIS K-6301 and the thus prepared O-rings were subjected to measurement of compression set under a 25% compression condition at 200° C. for 70 hours.

Furthermore, 30 to 40 mg of the roll-kneaded compositions were placed in a heat decomposition oven and decomposed at the one-minute half-value temperature of the organic peroxide having a lower activation energy for 20 minutes, and the generated gas was quantitatively determined by gas chromatography (QP-1000 GC-MS, made by Shimadzu Seisakusho K. K., Japan). The results are shown in the following Table as ratios of CH$_3$I and CH$_3$B generated when the two kinds of organic peroxides were used together, on the basis of CH$_3$I and CH$_3$B generated when the now most widely used 2,5-dimethyl-2,5-di(t-butylperoxy)hexane was used.

EXAMPLES 6 AND 7

In Examples 2 or 4, the amount of MT carbon black was changed to 15 parts by weight and 5 parts by weight of powdery activated carbon was further added to the compositions.

COMPARATIVE EXAMPLE 3

In Example 7, no 2,5-dimethyl-2,5-di(t-butylperoxy)-hexane was used.

EXAMPLES 8 AND 9

In Example 2, 0.5 parts by weight (Example 8) or 1.0 part by weight (Example 9) of 8-benzyl-1,8-diazabicyclo[5,4,0]undecene salt of 2-mercaptobenzimidazole was further added to the composition.

EXAMPLE 10

In Example 6, 1.0 part by weight of 8-benzyl-1,8-diazabicyclo[5,4,0]undecene salt of 2-mercaptobenzimidazole was further added to the composition.

Results of measurements in the foregoing Example 6 to 10 and Comparative Example 3 are shown also in the following Table.

TABLE

| Example | Hardness (JIS-A) | 100% modulus (kg/cm$^2$) | Tensile strength (kg/cm$^2$) | Elongation (%) | Compression set (%) | CH$_3$I ratio | CH$_3$Br ratio |
|---|---|---|---|---|---|---|---|
| Example 1 | 71 | 45 | 256 | 292 | 38 | 0.22 | 0.33 |
| Example 2 | 71 | 46 | 248 | 289 | 37 | 0.20 | 0.28 |
| Example 3 | 71 | 45 | 242 | 292 | 43 | 0.09 | 0.20 |
| Example 4 | 71 | 44 | 241 | 292 | 42 | 0.17 | 0.29 |
| Example 5 | 71 | 44 | 244 | 295 | 44 | 0.20 | 0.27 |
| Comp. Ex. 1 | 71 | 51 | 246 | 261 | 35 | 1.0 | 1.0 |
| Comp. Ex. 2 | 69 | 27 | 222 | 414 | 58 | 0.004 | — |
| Example 6 | 73 | 63 | 182 | 296 | 31 | 0.40 | — |
| Example 7 | 73 | 64 | 179 | 304 | 33 | 0.21 | — |
| Comp. Ex. 3 | 70 | 36 | 131 | 491 | 48 | — | — |
| Example 8 | 72 | 50 | 205 | 262 | 39 | 0.11 | 0.06 |
| Example 9 | 72 | 50 | 186 | 248 | 41 | — | — |
| Example 10 | 74 | 64 | 180 | 291 | 34 | — | — |

Note) "—" shows below the detection limit

What is claimed is:
1. A cross-linkable, fluorine-containing elastomer composition which comprises a fluorine-containing elastomer containing at least one of iodine and bromine in the molecule, an organic peroxide (A) having a peroxy group represented by the general formula —O—O—C(CH$_3$)$_2$R, wherein R is a lower alkyl group in the molecule and the peroxide has an activation energy of not less than 34.0 Kcal/mole, and another peroxide (B) having the same peroxy group as defined above in the molecule and an activation energy of less than 34.0 Kcal/mole, wherein the organic peroxides (A) and (B) are used in a ratio of (A) to (B) of 1:0.5–10 and 0.1 to 10 parts by weight of the sum total of (A) and (B) is used per 100 parts by weight of said fluorine-containing elastomer.

2. A cross-linkable, fluorine-containing elastomer composition according to claim 1, wherein the fluorine-containing elastomer containing at least one of iodine and bromine in the molecule is a fluorine-containing olefin copolymer obtained by polymerization reaction of fluorine-containing olefins in the presence of a saturated or unsaturated, linear or aromatic compound represented by the general formula RBr$_n$I$_m$, wherein R is a fluorohydrocarbon group, a chlorofluorohydrocarbon group, a chlorohydrocarbon group or a hydrocarbon group and n and m are 1 or 2.

3. A cross-linkable, fluorine-containing elastomer composition according to claim 1, wherein the fluorine-containing elastomer containing iodine in the molecule is a fluorine-containing olefin copolymer obtained by polymerization reaction of fluorine-containing olefins in the presence of an iodine-substituted aromatic compound, perfluoroaromatic compound, or saturated or unsaturated aliphatic hydrocarbon, fluoroaliphatic hydrocarbon or chlorofluoroaliphatic hydrocarbon.

4. A cross-linkable, fluorine-containing elastomer composition according to claim 1, wherein the fluorine-containing elastomer containing bromine in the molecule is a fluorine-containing olefin copolymer obtained by polymerization reaction of fluorine-containing olefins in the presence of a bromine-substituted aromatic compound, perfluoroaromatic compound, or saturated or unsaturated aliphatic hydrocarbon.

5. A cross-linkable, fluorine-containing elastomer composition according to claim 2, wherein the fluorine-containing elastomer containing at least one of iodine and bromine is contained at least one of iodine and bromine in a combining ratio of 0.001 to 10% by weight.

6. A cross-linkable, fluorine-containing elastomer composition according to claim 1, wherein 0.1 to 15 parts by weight of a polyfunctional compound is further contained per 100 parts by weight of the fluorine-containing elastomer containing at least one of iodine and bromine.

* * * * *